United States Patent [19]
Wu

[11] Patent Number: 6,032,934
[45] Date of Patent: Mar. 7, 2000

[54] SHOCK-ABSORBING DEVICE

[76] Inventor: King-Chang Wu, No. 28, Ching-Chen 10th St., Taichung CIty, Taiwan

[21] Appl. No.: 09/293,267

[22] Filed: Apr. 15, 1999

[51] Int. Cl.[7] ......................................................... B62J 1/02
[52] U.S. Cl. ............................ 267/132; 267/281; 267/293
[58] Field of Search ..................................... 267/132, 133, 267/269–271, 273, 279–282, 293, 294; 74/551.2, 551.4, 551.5, 551.6; 280/276, 279, 280, 281.1, 283, 668

[56] References Cited

U.S. PATENT DOCUMENTS

| | | | |
|---|---|---|---|
| 4,002,327 | 1/1977 | Damon | 267/281 |
| 4,939,950 | 7/1990 | Girvin | 74/551.2 |
| 5,241,881 | 9/1993 | Chen | 74/551.2 |
| 5,263,736 | 11/1993 | Stevens | 280/668 |
| 5,511,444 | 4/1996 | Clausen et al. | 74/551.2 |
| 5,586,780 | 12/1996 | Klein et al. | 280/275 |
| 5,671,821 | 9/1997 | McGreen | 180/221 |
| 5,752,711 | 5/1998 | Moreau | 280/276 |

*Primary Examiner*—Chris Schwartz
*Attorney, Agent, or Firm*—Christensen, O'Connor Johnson & Kindness PLLC

[57] ABSTRACT

A shock-absorbing device includes a first crank member, a buffering unit and a second crank member. The first crank member has a first hole formed therein. The buffering unit is inserted into the first hole, and has a cylindrical hollow outer wall, a cylindrical hollow inner wall coaxially mounted in the outer wall, an annular rubber cushion disposed between the inner and outer walls, and a shaft extending through and engaging the inner wall. The outer wall engaging the first crank member. The second crank member is connected to and is rotatable about and together with the shaft. The rubber cushion is deformed by the outer and inner walls in order to retard pivotal movement of the first crank member relative to the second crank member about the shaft.

3 Claims, 13 Drawing Sheets

SHOCK-ABSORBING DEVICE

BACKGROUND OF THE INVENTION

1. Field of the Invention

This invention relates to a shock-absorbing device, more particularly to a durable shock-absorbing device.

2. Description of the Related Art

Figure 1:
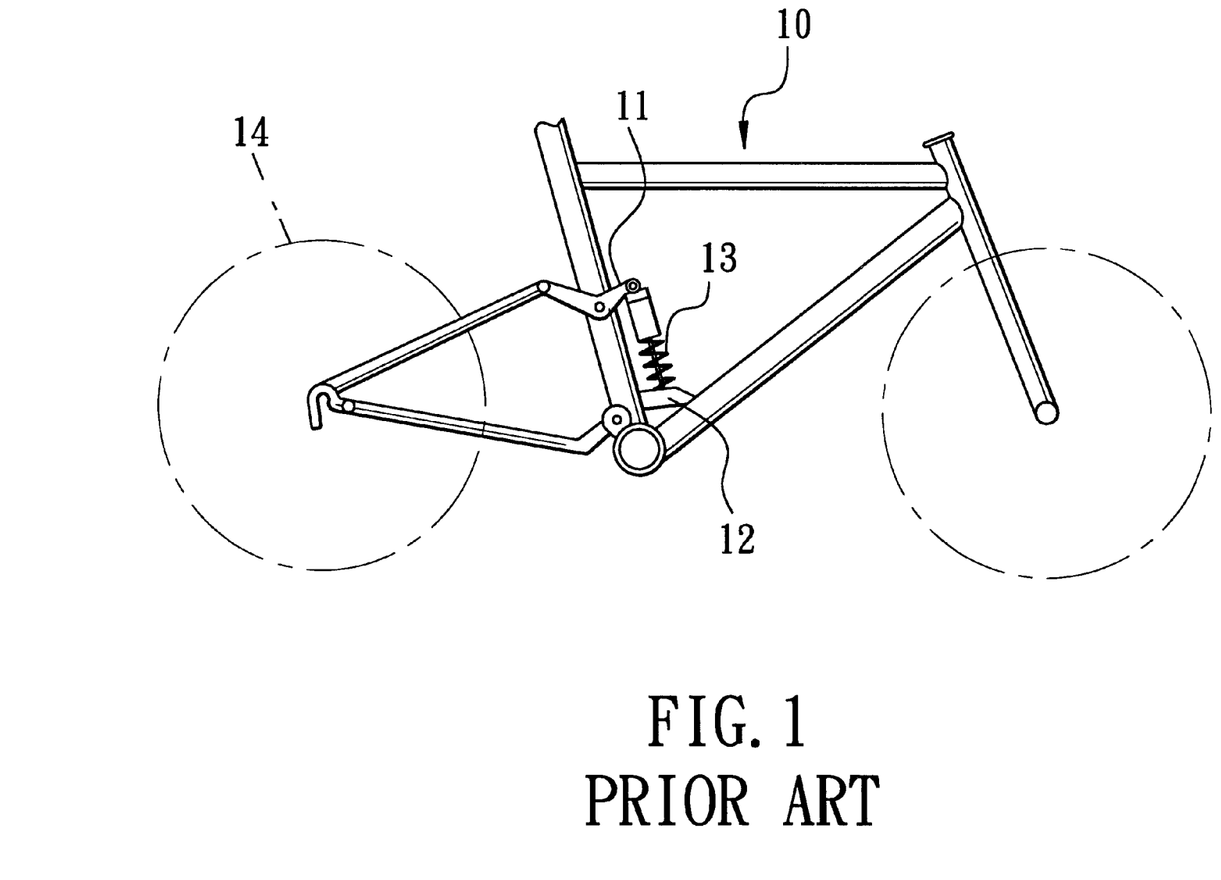
FIG. 1 illustrates a conventional shock-absorbing device that is adapted to be connected to a bicycle frame.

Referring to FIG. 1, a conventional shock-absorbing device is shown to comprise a length of coiled spring 13 that is adapted to be connected to a bicycle frame 10. The ends of the coiled spring 13 are connected pivotally to two pivot lugs 11, 12 that are mounted on the bicycle frame 10. When shock is transmitted from a rear bicycle wheel 14 to the bicycle frame 10, the coiled spring 13 is deformed longitudinally in order to retard the vibration of the rear bicycle wheel 14.

Figure 2:
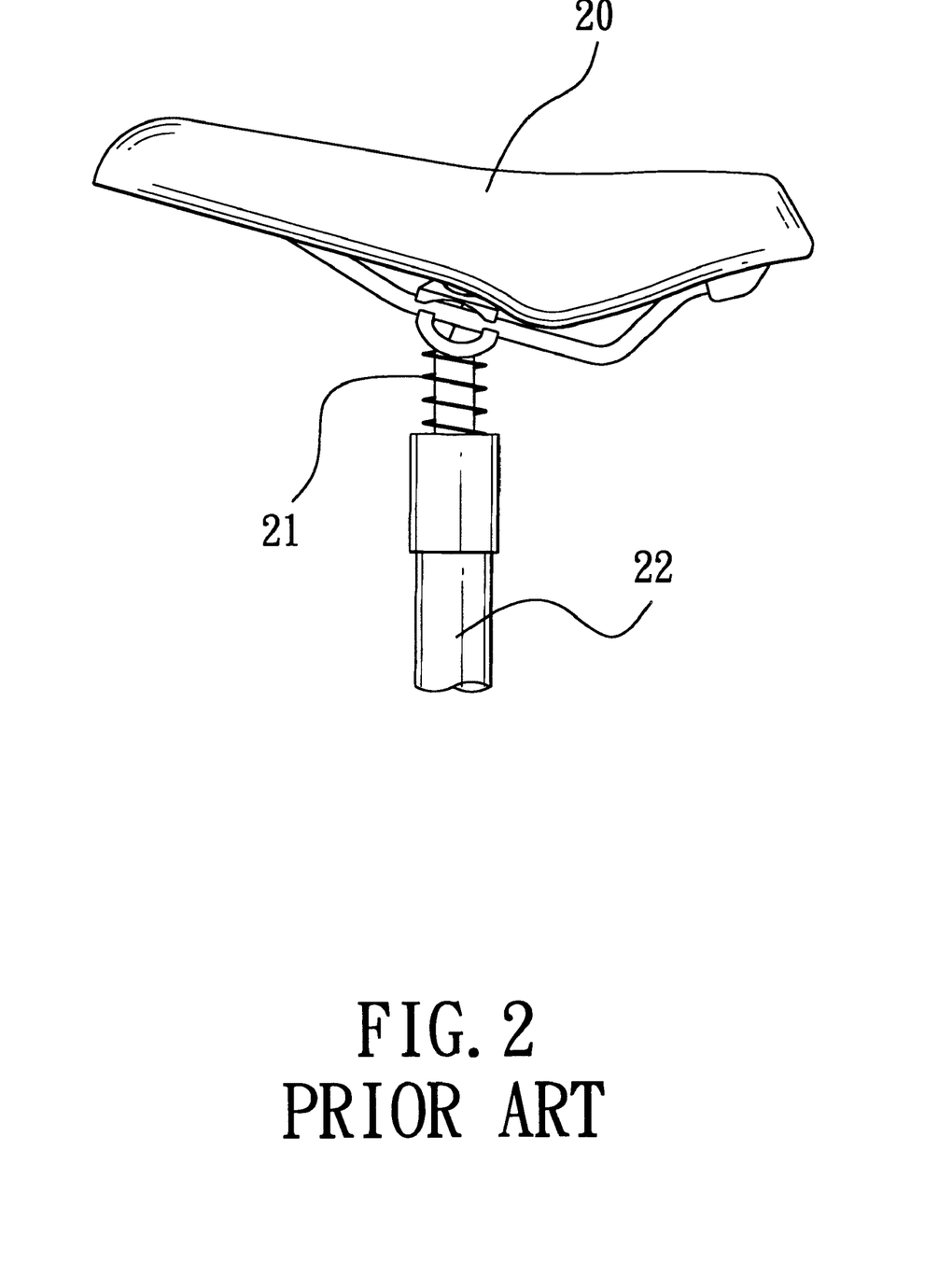
FIG. 2 illustrates another conventional shock-absorbing device that is adapted to be connected to a seat and a seat tube of a bicycle.

Referring to FIG. 2, another conventional shock-absorbing device is shown to include a coiled spring 21 that is adapted to be disposed between a seat 20 and a seat tube 22 of a bicycle. When shock is transmitted from the seat 20 to the seat tube 22, the coiled spring 21 is deformed in order to retard the vibration of the seat 20.

Since the conventional shock-absorbing devices are made of metal and are exposed to air, the weather resistance and the durability of the conventional shock-absorbing devices are relatively poor.

SUMMARY OF THE INVENTION

The object of the present invention is to provide a shock-absorbing device that is both weather-resistant and is durable.

According to the present invention, the shock-absorbing device comprises a first crank member, a buffering unit and a second crank member. The first crank member has a first hole formed therein. The buffering unit is inserted into the first hole, and has a cylindrical hollow outer wall, a cylindrical hollow inner wall coaxially mounted in the outer wall, an annular rubber cushion disposed between the inner and outer walls, and a shaft extending through and engaging the inner wall. The outer wall engages the first crank member. The second crank member is connected to and is rotatable about and together with the shaft. The rubber cushion is deformed by the outer and inner walls in order to retard pivotal movement of the first crank member relative to the second crank member about the shaft the first crank member further includes an engaging wall that confines the first hole, a split opening formed in the engaging wall and extending radially to communicate with the first hole, two threaded holes which are formed in the engaging on two sides of the split opening and which are aligned in a direction parallel to a line tangent to the first hole, and a clamping screw engaging threadedly the threaded holes.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Before the present invention is disclosed in greater detail, it should be noted that like elements are denoted by the same reference numerals throughout the disclosure.

Figure 3:
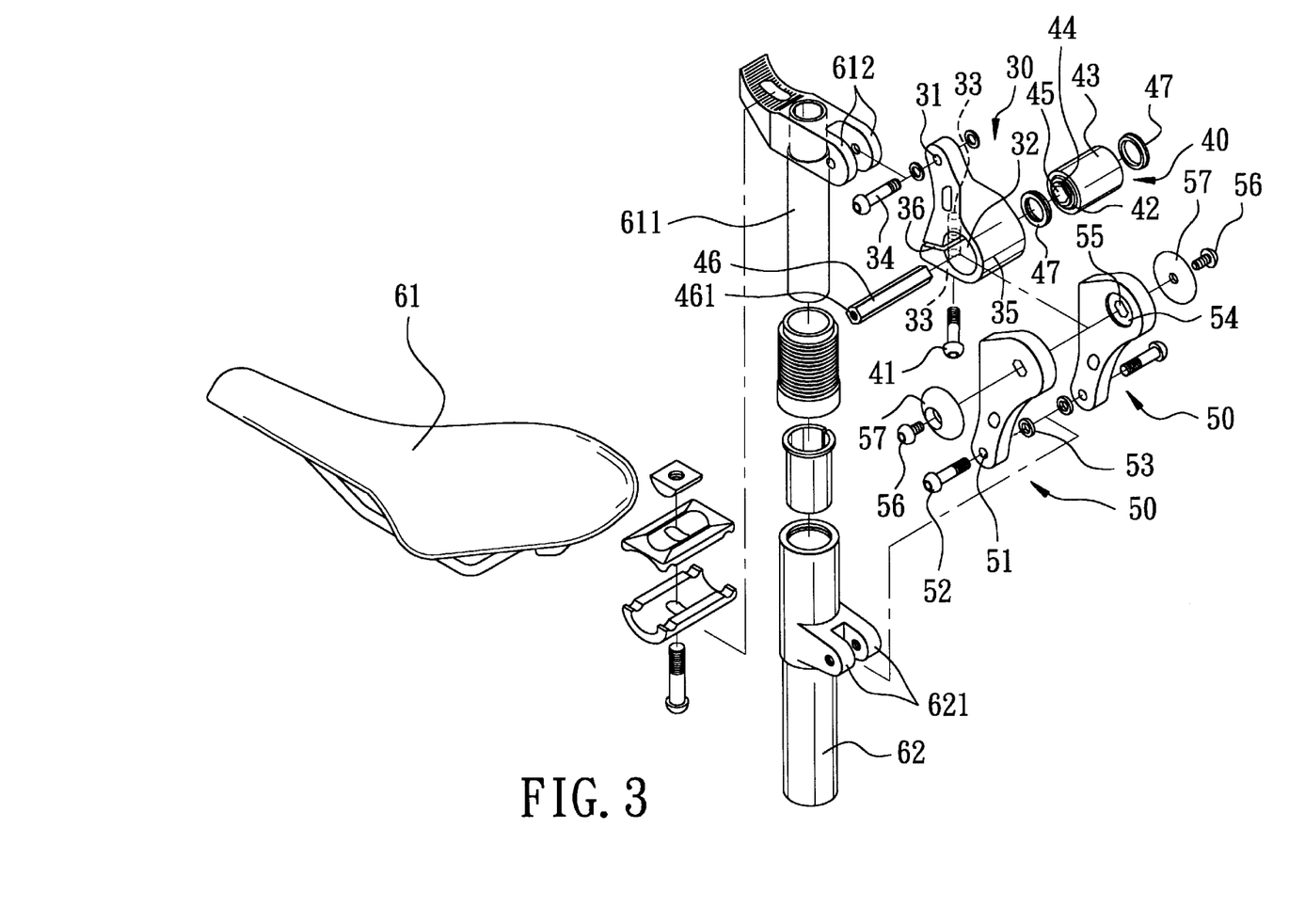
FIG. 3 is an exploded view of a first preferred embodiment of a shock-absorbing device according to the present invention, in which the shock-absorbing device is connected to a seat and a seat tube of a bicycle.
Figure 4:
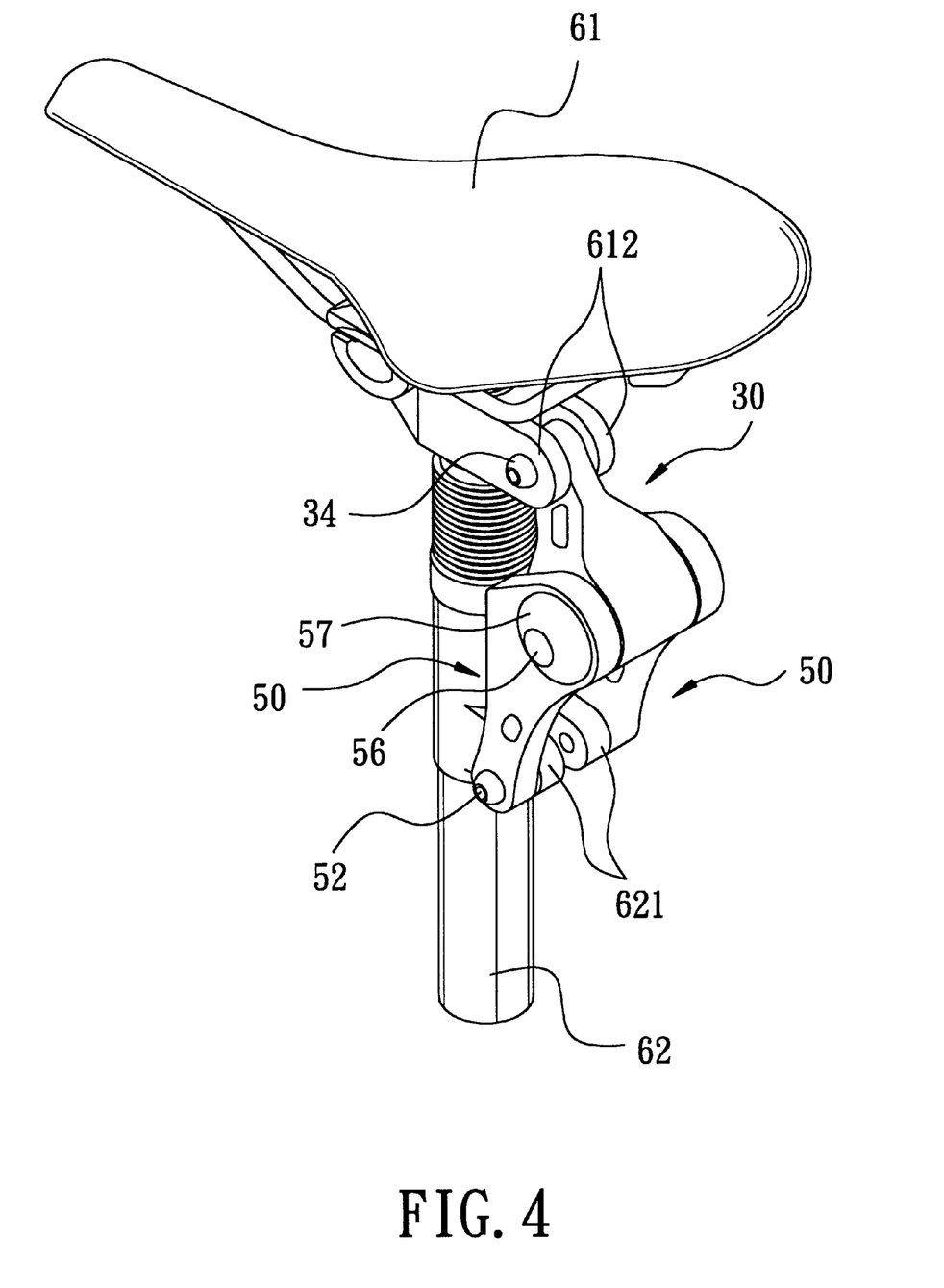
FIG. 4 is a perspective view of the first preferred embodiment of the shock-absorbing device that is connected to the seat and the seat tube according to the present invention.
Figure 5:
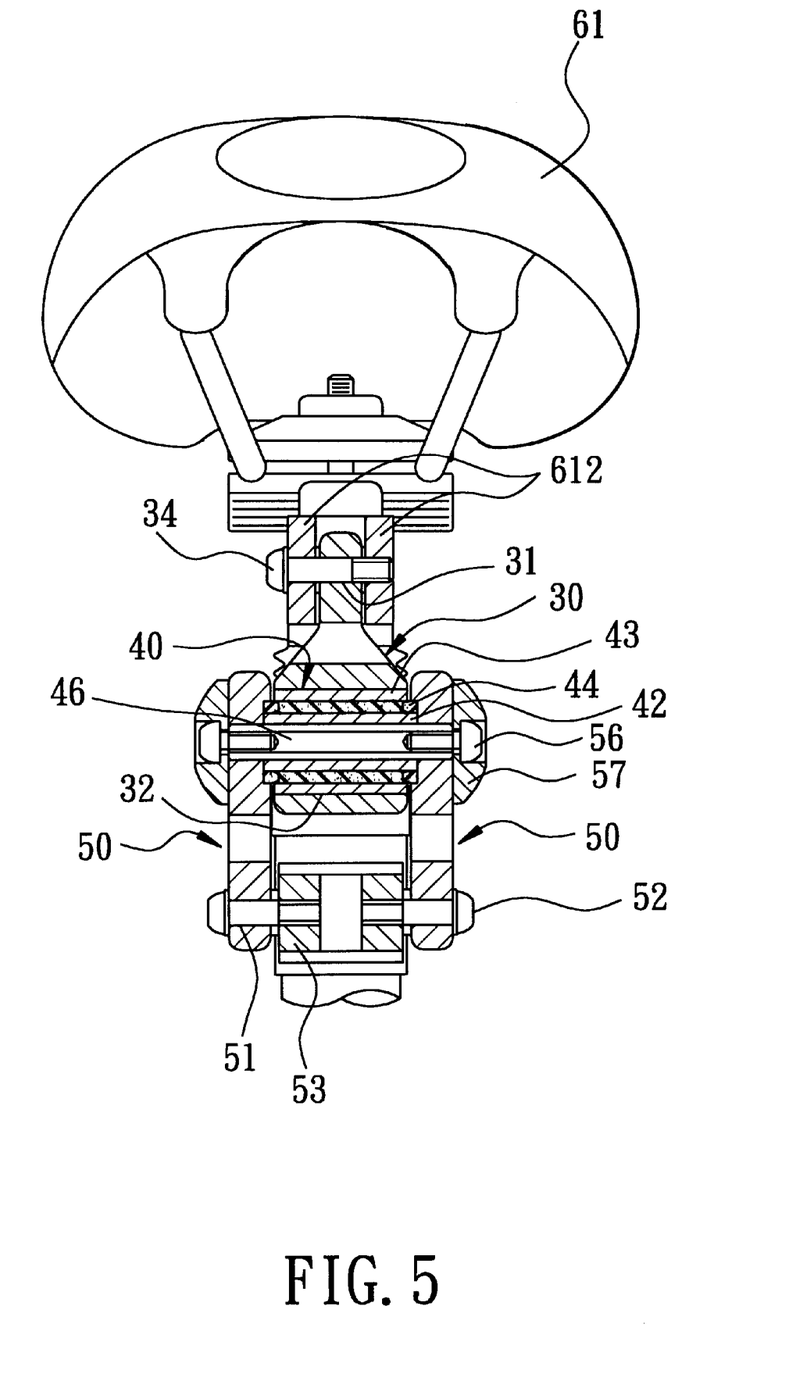
FIG. 5 is a cross-sectional view of the first preferred embodiment of the shock-absorbing device of FIG. 4.
Figure 6A:
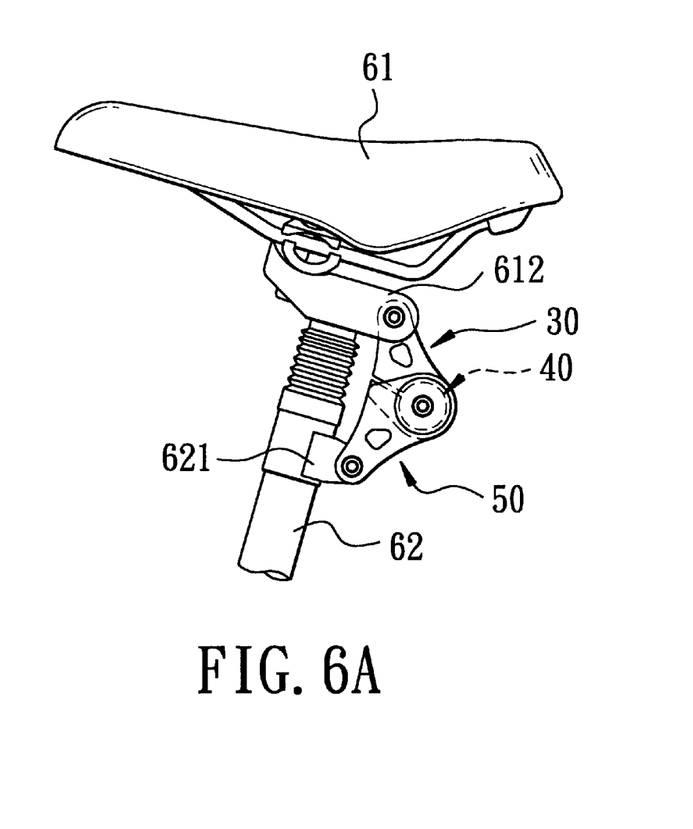
FIGS. 6A to 6C illustrate how the first preferred embodiment of the shock-absorbing device of FIG. 4 operates according to the present invention.
Figure 6B:
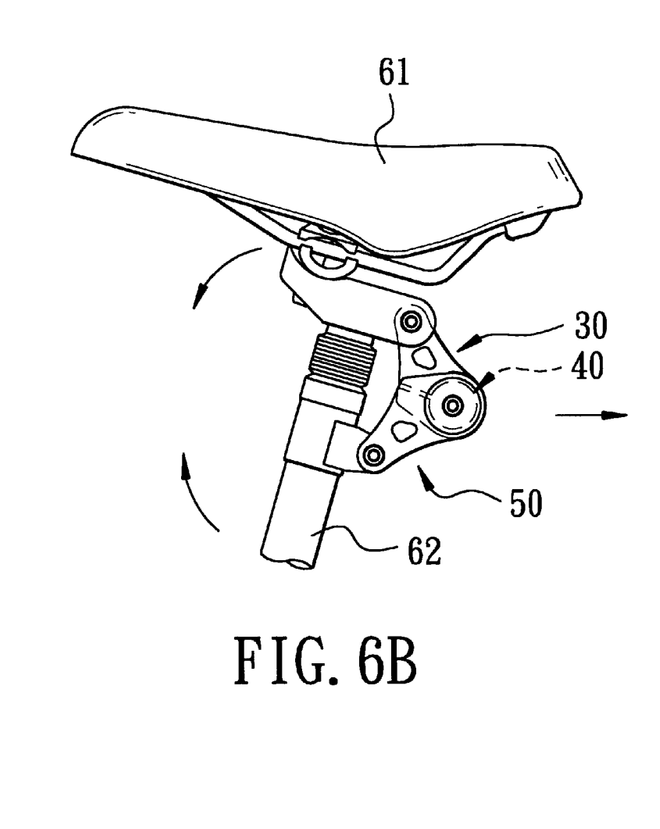
Figure 6C:
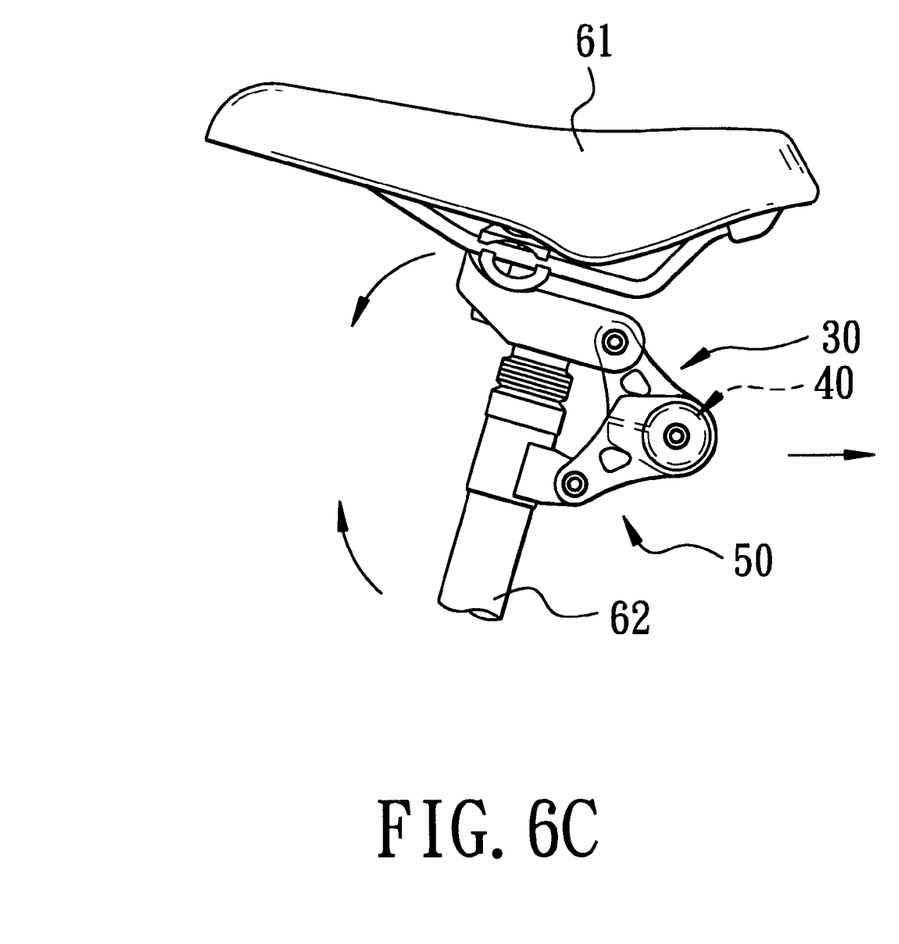

Referring to FIGS. 3 and 4, a first preferred embodiment of a shock-absorbing device according to the present invention is shown to comprise a first crank member 30, a buffering unit 40, and a second crank member that includes two elongated crank plates 50. The shock-absorbing device is connected to two pivot lugs 612, 621 that are formed respectively on a seat shaft 611 of a seat 61 and a seat tube 62.

The fan first crank member 30 has a pivot hole 31 formed in one end thereof, and a hole 32 formed in the other end thereof. The hole 32 is confined by an engaging wall 35. A split opening 36 is formed in the engaging wall 35, and extends radially to communicate with the hole 32. Two threaded holes 33 are formed in the engaging wall 35 on two sides of the split opening 36 and are aligned in a direction parallel to a line tangent to the hole 32. A clamping screw 41 engages threadedly the threaded holes 33. A locking pin 34 extends through the pivot hole 31 and the pivot lugs 612 to interconnect pivotally the first crank member 30 and the seat shaft 611 of th e seat 61.

The buffering unit 40 is inserted into the hole 32 and has a cylindrical hollow outer wall 43, a cylindrical hollow inner wall 42 coaxially mounted in the outer wall 43, and an annular rubber cushion 44 disposed between the inner and outer walls. The outer and inner walls 43, 42 are made of metal. A shaft 46 extends through and engages the inner wall 42. The outer wall 43 engages the first crank member 40. The inner wall 42 has a through bore 45 of a hexagonal cross-section. The shaft 46 has a hexagonal cross-section to engage correspondingly the through bore 45 in the inner wall 42, and two axial threaded bores 461 (only one is shown in FIG. 3) formed in two opposite ends thereof. Two press washers 47 are disposed respectively on two opposite ends of the inner wall 42.

The crank plates 50 are disposed on two sides of the first crank member 40. The shaft 46 projects out from the hole 32 and extends through the crank plates 50. The rubber cushion 44 and the inner wall 42 project out from the outer wall 43 and extend into the crank plates 50. Specifically, each of the crank plates 50 has a pivot hole 51 formed in one end thereof, and a locking pin 52 that extends through the pivot hole 51 and the pivot lugs 621 on the seat tube 62 and that engages a retainer ring 53 in order to interconnect pivotally the crank plates 50 and the seat tube 62. The crank plates 50 further have two recesses 54 that are formed in two opposed faces adjacent to the other ends thereof and that are adapted to receive the press washers 47. Each of the recesses 54 has a hexagonal hole 55 formed therethrough. The opposite ends of the shaft 46 extend respectively through the hexagonal holes 55 and two washers 57. Two locking bolts 56 extend into and engage threadedly the threaded holes 461 in the shaft 46, respectively. Therefore, the crank plates 50 are connected to and are rotatable about and together with the shaft 46.

Referring to FIG. 5 and FIGS. 6A to 6C, since the shaft 46 is rotatable with the crank plates 50, the inner wall 42 will rotate with respect to the outer wall 43 to compress the rubber cushion 44 when the seat 61 and the seat tube 62 move relative to one another, which movement can produce a vibration that is transmitted to either the first crank member 30 or to the crank plates 50. As such, the rubber cushion 44 is deformed by the outer and inner walls 43, 42 in order to retard pivotal movement of the first crank member 30 relative to the crank plates 50 about the shaft 46. Since the rubber cushion 44 is disposed between the outer and inner walls 43, 42 of the buffering unit 40, it has an excellent weather resistance, thereby resulting a prolonged service life.

Figure 7:
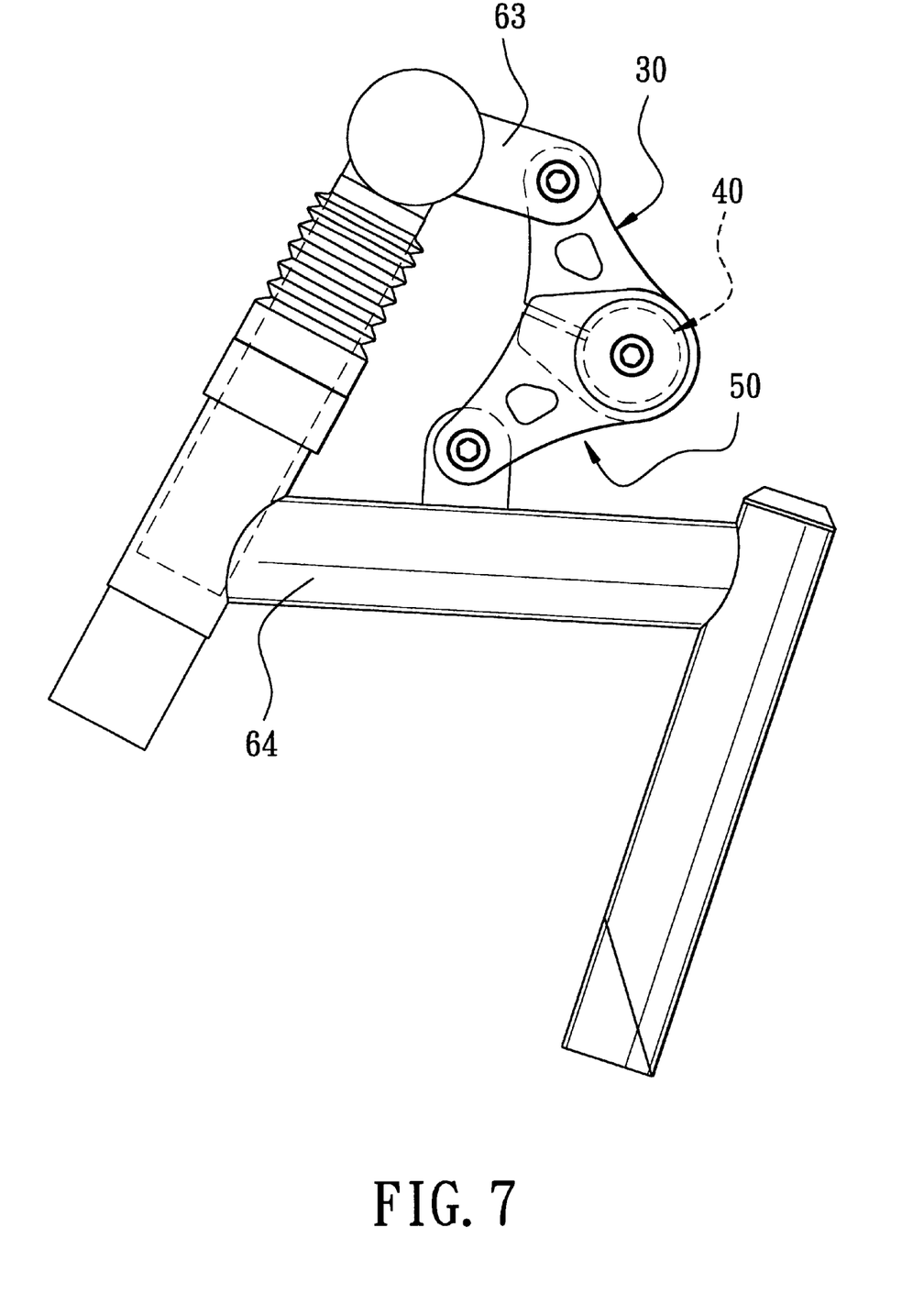
FIG. 7 is a schematic side view of a second preferred embodiment of the shock-absorbing device according to the present invention, in which the shock-absorbing device is connected to a handlebar and a stem of a bicycle.

FIG. 7 shows a second preferred embodiment of the shock-absorbing device according to the present invention. In this embodiment, the first crank member 30 is connected pivotally to a handlebar 63, whereas the crank plates 50 are connected pivotally to a stem 64 of a bicycle. As such, the vibration of the handlebar 63 can be effectively dampened by the buffering unit 40 of the shock-absorbing device.

Figure 8:
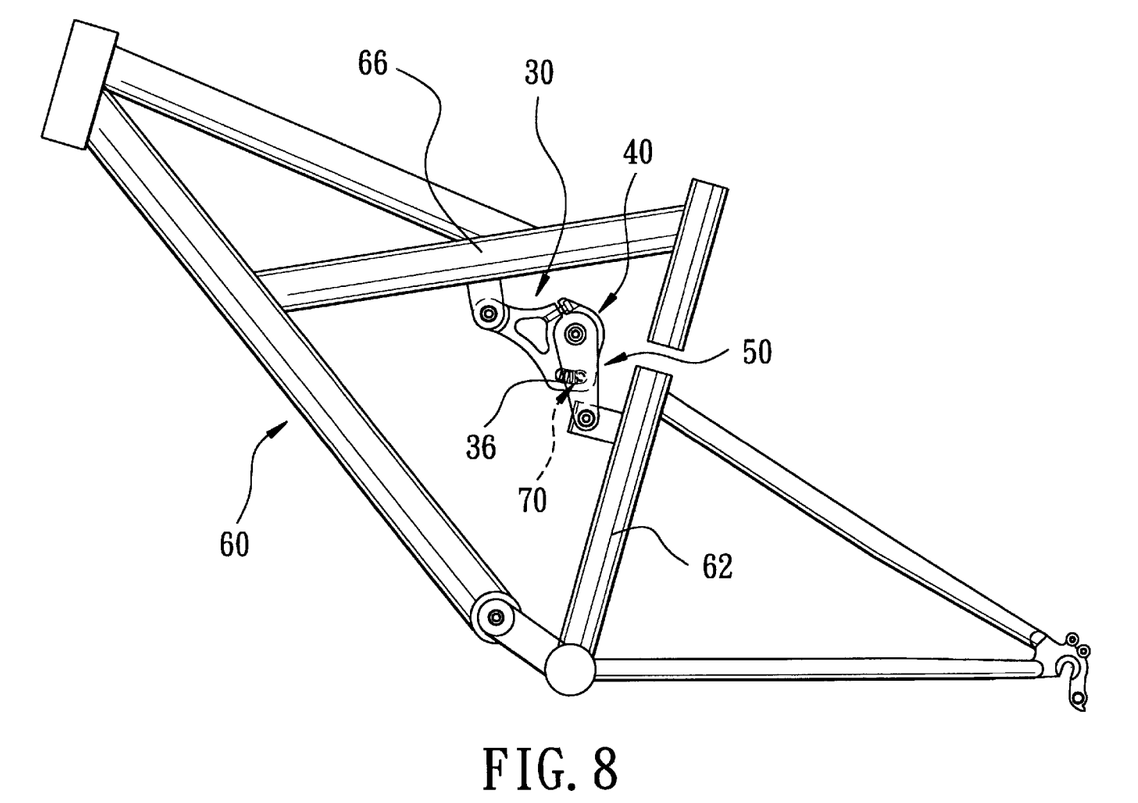
FIG. 8 is a schematic side view of a third preferred embodiment of a shock-absorbing device according to the present invention, in which the shock-absorbing device is connected to a transverse bar and a seat tube of a bicycle.
Figure 9:
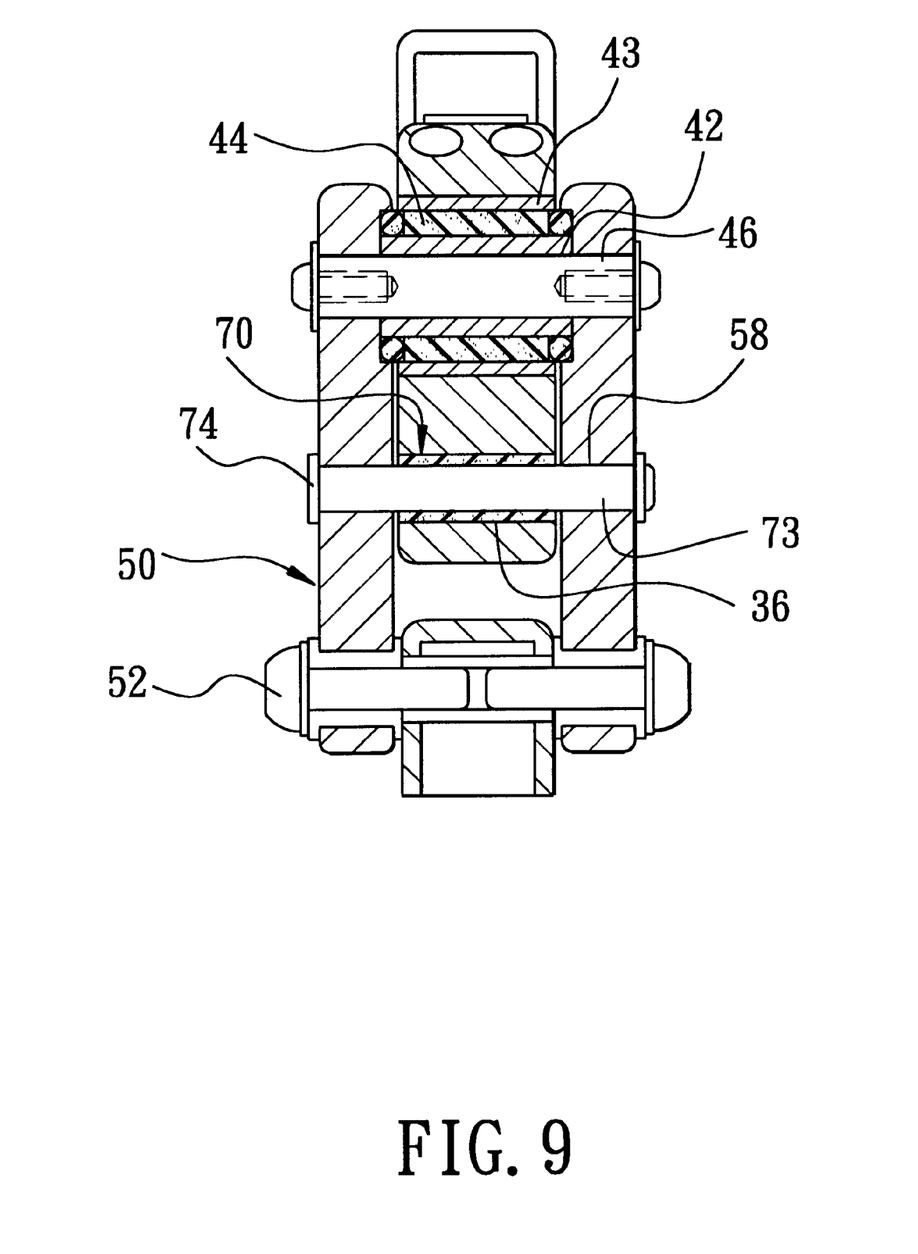
FIG. 9 is a cross-sectional view of the third preferred embodiment of the shock-absorbing device according to the present invention.
Figure 10A:
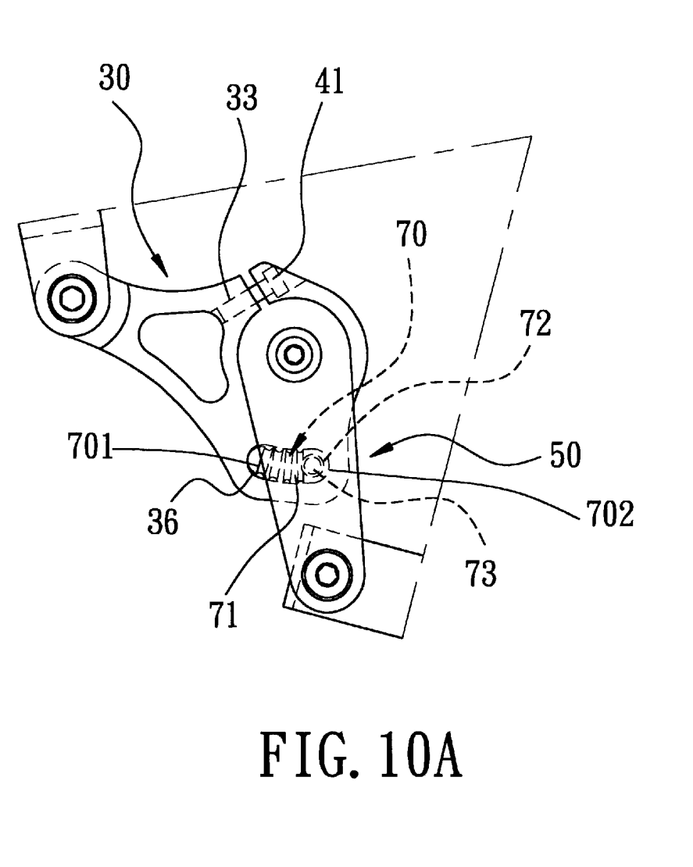
FIGS. 10A and 10B illustrate how the third preferred embodiment of the shock-absorbing device operates according to the present invention.
Figure 10B:
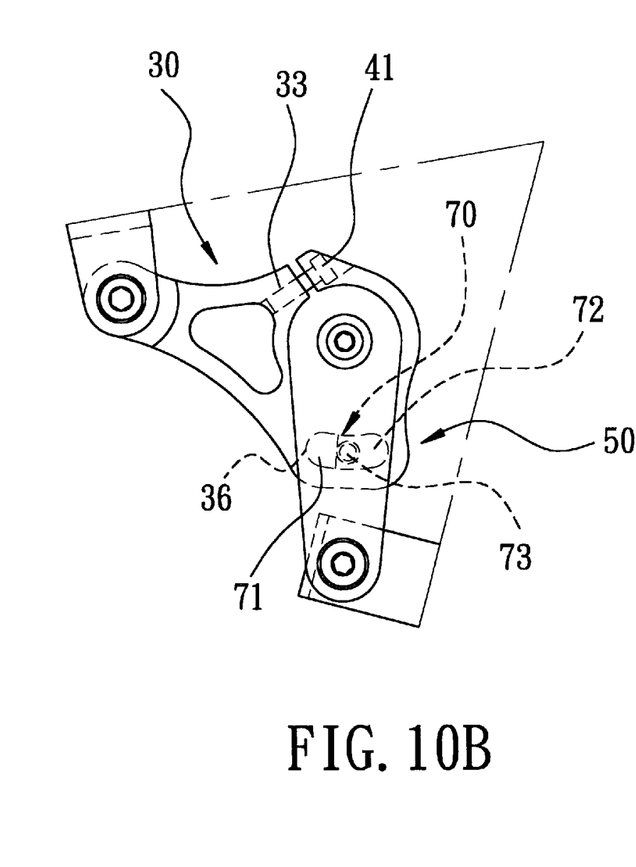

Referring to FIGS. 8 and 9, a third preferred embodiment of a shock-absorbing device of the present invention is shown to comprise a first crank member 30, a buffering unit 40, and a second crank member that includes two crank plates 50. In this embodiment, the first crank member 30 is connected pivotally to a crossbar 66 of the bicycle frame 60, whereas the crank plates 50 are connected pivotally to the seat tube 62. The first crank member 30 further includes a pin member 73 parallel to the shaft 46, a hole 36 formed in the engaging wall 35 and receiving the pin member 73, and a rubber bar 70 disposed in the hole 36 around the pin member 73. The pin member 73 projects outward through the crank plates 50 from the hole 36. The hole 36 has a cross-section elongated in an angular direction about the shaft 46 to permit the pin member 73 to move in the hole 36, as best illustrated in FIGS. 10A and 10B. The rubber bar 70 further has two angularly opposing ends 701, 702, a pin hole 72 extending axially adjacent to one of the angularly opposing ends 702 to receive the pin member 73, and a corrugated compressible part 71 extending from t he pin hole 72 to the other one of the angularly opposing ends 701. With the aforesaid structure, the rubber bar 70 is compressible in the angular direction in order to enhance the shock-absorbing effect of the shock-absorbing device when the first crank member 30 and the crank plates 50 are pivoted relative to one another about the buffering unit 40.

Figure 11A:
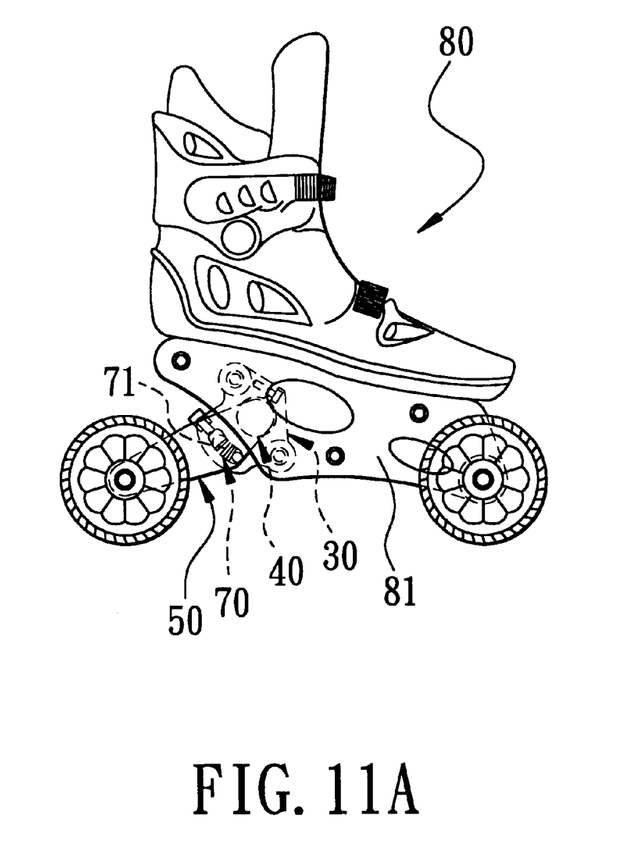
FIG. 11A to 11C illustrate how a fourth preferred embodiment of the shock-absorbing device operates according to the present invention.
Figure 11B:
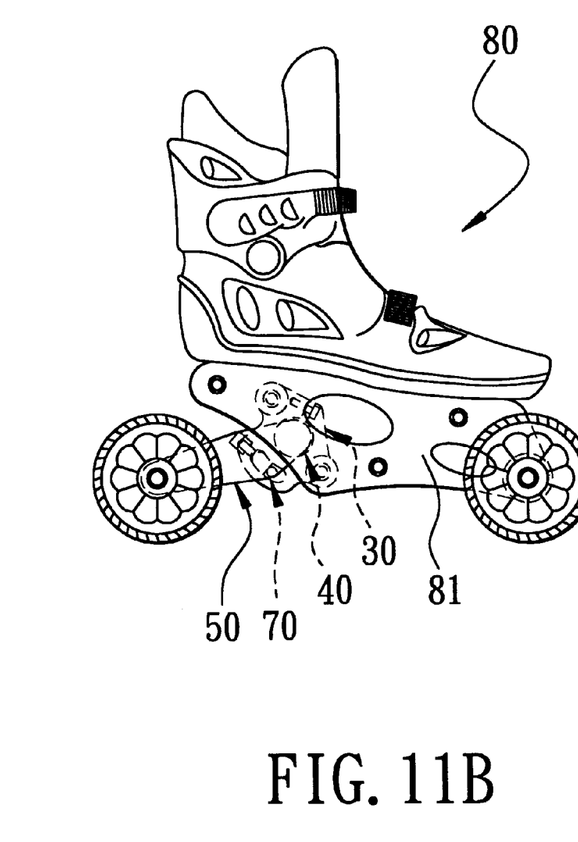
Figure 11C:
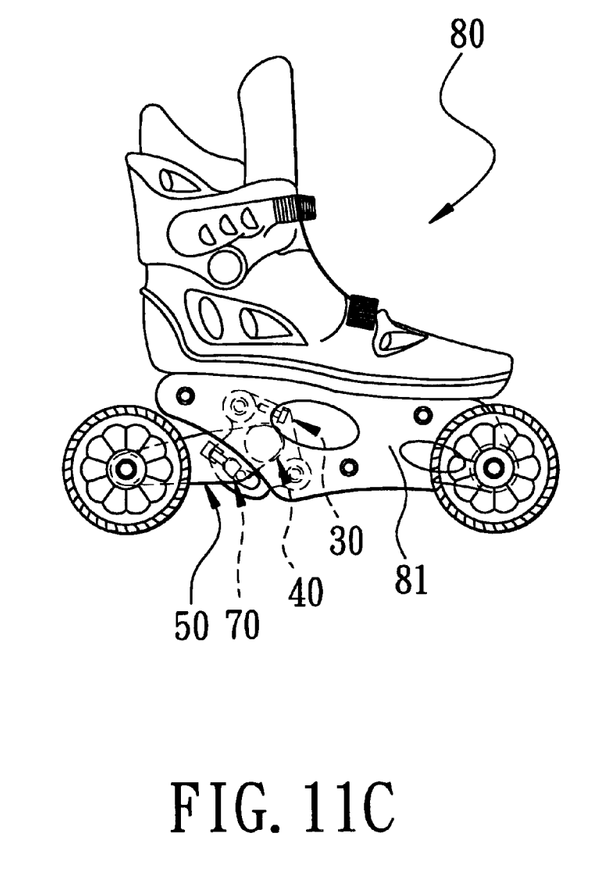

Referring to FIGS. 11A to 11C, a fourth preferred embodiment of a shock-absorbing device of the present invention is shown to comprise a first crank member 30, a buffering unit 40, and a second crank member that includes two crank plates 50. In this embodiment, the structure of the shock-absorbing device is similar to that of the shock-absorbing device of the third embodiment. The first crank member 30 is connected pivotally to a bottom portion 81 of the roller skate 80. The crank plates 50 are connected pivotally to the rear wheel axle 82 of the roller skate 80. When the first crank member 30 and the crank plates 50 move relative to one another, the shock that is transmitted from the rear wheel axle 82 to the bottom portion 81 of the roller skate 80 can be absorbed due to the deformation of the rubber cushion 44 of the buffering unit 40 and the rubber bar 70.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A shock-absorbing device comprising:
a first crank member having a first hole formed therein, said first crank member further including:
an engaging wall that confines said hole, a split opening formed in said engaging wall and extending radially to communicate with said first hole, two threaded holes which are formed in said engaging wall on two sides of said split opening and which are aligned in a direction parallel to a line tangent to said first hole, and a clamping screw engaging threadedly said threaded holes;
a buffering unit inserted into said first hole and having a cylindrical hollow outer wall, a cylindrical hollow inner wall coaxially mounted in said outer wall, an annular rubber cushion disposed between said inner and outer walls, and a shaft extending through and engaging said inner wall, said outer wall engaging said first crank member; and
a second crank member connected to and rotatable about and together with said shaft, said rubber cushion being deformed by said outer and inner walls in order to retard pivotal movement of said first crank member relative to said second crank member about said shaft.

2. The shock-absorbing device as claimed in claim 1, wherein:
said second crank member includes a pair of crank plates disposed on two sides of said first crank member, said shaft projecting out from said first hole and extending through said crank plates;
said first crank member further includes a pin member parallel to said shaft, a second hole formed in said engaging wall and receiving said pin member, and a rubber bar disposed in said second hole around said pin member, said pin member projecting outward through said crank plates from said second hole, said second hole having a cross-section enlongated in an angular direction about said shaft to permit said pin member to move in said second hole, said rubber bar being compressible in said angular direction.

3. The shock-absorbing device as claimed in claim 2, wherein said rubber bar further has two angularly opposing ends, a pin hole extending axially adjacent to one of said angularly opposing ends to receive said pin member, and a corrugated compressible part extending from said pin hole to the other one of said angularly opposing ends.

\* \* \* \* \*

UNITED STATES PATENT AND TRADEMARK OFFICE
CERTIFICATE OF CORRECTION

PATENT NO. : 6,032,934
DATED : March 7, 2000
INVENTOR(S) : K.-C. Wu

It is certified that error appears in the above-identified patent and that said Letters Patent is hereby corrected as shown below:

<u>COLUMN</u>  <u>LINE</u>

[57]        Abstract      "wall. The" should read --wall, with the--
Pg. 1, col. 2   8 of text 4           56            "enlongated" should read --elongated--
(Claim 2,   line 13)

Signed and Sealed this

Seventeenth Day of April, 2001

Attest:

NICHOLAS P. GODICI

Attesting Officer    Acting Director of the United States Patent and Trademark Office